United States Patent
Hertel

[15] 3,658,456
[45] Apr. 25, 1972

[54] SCARCELY DUSTING COMPOSITION CONSISTING OF ICE-COLOR COUPLING COMPONENT AND AN ETHYLENE OXIDE ADDITION PRODUCT

[72] Inventor: Hasso Hertel, Muhlheim, Main, Germany

[73] Assignee: Farbwerke Hoechst Aktiengesellschaft vormals Meister Lucius & Bruning, Frankfurt/Main, Germany

[22] Filed: Dec. 9, 1969

[21] Appl. No.: 883,604

[30] Foreign Application Priority Data

Dec. 24, 1968 Germany...................P 18 16 984.1

[52] U.S. Cl....................................8/44, 8/173, 8/79 AD
[51] Int. Cl.....................................C09b 27/00, C09b 43/16
[58] Field of Search.................................8/44, 173, 79 AD

[56] References Cited

UNITED STATES PATENTS

| | | |
|---|---|---|
| 3,288,552 | 11/1966 | Streck...........................................8/44 |
| 2,181,800 | 11/1939 | Crossley et al............................134/58 |
| 3,232,694 | 2/1966 | Grenier et al................................8/39 |

Primary Examiner—George F. Lesmes
Assistant Examiner—Patricia C. Ives
Attorney—Connolly and Hutz

[57] ABSTRACT

Scarcely dusting ice color coupling components are obtained by admixture of 0.5 to 15 percent by weight of an addition product of 2 to 5 mols of ethylene oxide to a lower alkanol, the resulting polyether having a molecular weight of about 150 to about 280. Optionally surfactants, complex-forming agents and inorganic salts are added.

3 Claims, No Drawings

SCARCELY DUSTING COMPOSITION CONSISTING OF ICE-COLOR COUPLING COMPONENT AND AN ETHYLENE OXIDE ADDITION PRODUCT

The present invention provides scarcely dusting pulverulent dye preparations to be used for the ice color dyeing.

Coupling components generally used in the ice color dyeing are arylamides of aromatic or heterocyclic o-hydroxy-carboxylic acids and of acylacetic acids. They are commercially available in solid finely distributed form and can therefore easily be dissolved when used. However, when used they form a lot of dust which, apart from the troubles involved, may be intolerable from the physiological point of view. It is known that dusting of fine powders can be reduced to a large extent by adding water-insoluble liquids or oil- or wax-like materials (cf. German Pat. Nos. 274,642 and 830,501 as well as British Pat. No. 576,100). These materials, however, cannot be used for arylamides of aromatic or heterocyclic o-hydroxy-carboxylic acids or of acylacetic acids since they cause turbid impregnation baths or produce oily deposits in dye baths, which have an unfavorable effect on the dyeing process and deteriorate the dyeings obtained. These materials are mostly compounds having several hydroxy or ether groups per molecule.

Thus, British Pat. No. 713,541 proposes reaction products of two or more molecules of ethylene oxide with fatty alcohols as dust-preventing agents to be used for water-insoluble acetate rayon dyestuffs and refers to condensation products of octylcresol with 10 mols of ethylene oxide, cetyl alcohol with 17 mols of ethylene oxide as well as sperm oil alcohol with 2.5 mols of ethylene oxide as especially suitable agents. These compounds used for preventing dust formation of finely divided arylamides of aromatic or heterocyclic o-hydroxy-carboxylic acids and of acylacetic acids lead, however, to products that are not suitable for the ice color dyeing since the alkaline solutions form deposits and precipitates. For the same reason, condensation products of coconut fatty alcohol with 5 to 8 mols of ethylene oxide that have proved very suitable in preventing dust formation of finely divided primary aromatic amines used for ice color dyeing (cf. French Pat. No. 1,498,991) can also not be used.

It has now been found that azoic coupling components in powder form which contain an arylamide of an aromatic or heterocyclic o-hydroxy-carboxylic acid or of an acylacetic acid and about 0.5 to 15 percent, calculated on the arylamide, of a polyglycol ether of the general formula $$Alk - O(CH_2CH_2O)_nH \quad (I)$$

in which Alk stands for a straight chain or branched alkyl group having one to five carbon atoms and n for an integer of from two to five, with the proviso that the molecular weight ranges from about 150 to about 280, are distinguished by a very reduced dust formation.

The scarcely dusting dye powders of the invention are prepared by mixing the arylamides of aromatic or heterocyclic o-hydroxy-carboxylic acids or of acylacetic acids with one or more polyglycol ethers of the formula I, in which Alk and n have the above meaning.

Especially suitable are polyglycol ethers of the formula I, in which Alk and n have the following meaning:

| Alk | n |
|---|---|
| $CH_3-$ | 3, 4 or 5 |
| $CH_3CH_2-$ | 3 or 4 |
| $CH_3CH_2CH_2-$ | 3 |
| $(CH_3)_2CH-$ | 3 or 4 |
| $CH_3CH_2CH_2CH_2-$ | 2 |
| $CH_3CH_2CH(CH_3)-$ | 2 or 3 |
| $(CH_3)_2CHCH_2-$ | 2 or 3 |
| $(CH_3)_3C-$ | 2 or 3 |
| $(CH_3)_2CHCH_2CH_2$ | 2 |

The compositions according to the invention may be obtained by intimately mixing the finely divided arylamides with the dust-preventing agent or by mixing the arylamides with the dust-preventing agent and subsequently grinding the mixture. The second method is advantageously carried out by feeding the dust-preventing agent in a mixer that contains the arylamide, and then grinding the mixture in a suitable mill, for example a cross-beater mill or a pinned disk mill. Alternatively, the dust-preventing agent may also be fed in the mill during the grinding operation or it may already be incorporated with the moist arylamide prior to or during drying which is effected in a suitable drying device, for example a paddle dryer.

The dust-preventing effect is advantageously checked by means of a photo-electric method. For this purpose, a sample of the powder substance is dropped through a pipe into a measuring box which is equipped, laterally staggered with regard to the pipe, with a lamp and a photo-electric cell opposite to it. A galvanometer which is advantageously gaged in exstinction values indicates the obscuration of the light beam caused by the dust formation.

As arylamides of aromatic or heterocyclic o-hydroxy-carboxylic acids and of acylacetic acids there may be mentioned compounds currently used in the ice color technique (cf. Color Index, Second Edition, Vol. 3, C.I.N0. 37 505 - 37 625 as well as Additions and Amendments No. 1 (1963) to No. 20, 1968; L.Diserens, Die neuesten Fortschritte in der Anwendung der Farbstoffe, 3rd Edition 1951, Vol. 1, pages 543 to 557).

Thus, the arylamides are those of 2,3-hydroxy-naphthoic acid, of 6-bromo- or 6-alkoxy-2,3-hydroxy-naphthoic acid, of 2-hydroxy-carbazol-1- or -3-carboxylic acid, of 5-hydroxy-1,2,1',2'-benzo-carbazol-4-carboxylic acid, of 3-hydroxy-diphenylene-oxide-2-carboxylic acid, of 2-hydroxy-anthracene-3-carboxylic acid, of acetoacetic acid or terephthaloyl-bis-acetic acid. For technological reasons, the arylamides also contain, in most cases, surfactants, such as the sodium salts of benzenesulfonic acid, benzylsulfanilic acid, mono- or dialkyl-naphthalenesulfonic acids or methylene-bis-naphthalene-sulfonic acid, and/or complex-forming compounds, such for example as the sodium salt of ethylene-diamine-tetraacetic acid, and/or inorganic salts, such as sodium carbonate, sodium sulfate, sodium chloride or an alkali metal phosphate.

The following examples serve to illustrate the invention.

EXAMPLE 1

30 Kilograms of 1-(2',3'-hydroxy-naphthoylamino)-2-methyl-4-chlorobenzene were fed in a high-speed centrifugal mixer having a capacity of 135 liters. While mixing 900 g. of tetraethyleneglycol monomethyl ether of the formula $$CH_3O(CH_2CH_2O)_4H$$

were sprayed in within about 1 minute by means of a nozzle. Mixing was continued for 4 minutes and then the mixer was emptied. A composition was obtained, the dust formation of which was only one-fifteenth of that of the untreated compound.

EXAMPLE 2

In a grinding device 10 parts by weight of triethyleneglycol monobutyl ether of the formula $$(CH_3)_3CO(CH_2CH_2O)_3H$$

were ground with 60 parts by weight of 1-(2',3'-hydroxynaphthoylamino)-3-nitrobenzene. The scarcely moist powder was mixed at high speed in a centrifugal mixer with another 440 parts by weight of 1-(2',3'-hydroxy-naphthoylamino)-3-nitro-benzene.

A composition was obtained, the dust formation of which was only one-eighth of that of the untreated compound.

EXAMPLE 3

Moist 4,4'-bis-acetoacetylamino-3,3'-dimethyl-diphenyl was fed into a paddle dryer and 1 percent, calculated on the dry substance, of diethyleneglycol monobutyl ether of the formula $$CH_3CH_2CH_2CH_2O(CH_2CH_2O)_2H$$

was added portionwise. At a temperature of from 50° to 70° C. and under a pressure of 100 mm. mercury, water was removed. The dried material was then withdrawn via a connected sieving machine. A composition was obtained, the dust formation of which was only one-fifth of that of an untreated material.

EXAMPLE 4

100 Parts by weight of a press cake of 1-(5'-hydroxy-1',2',1'',2''-benzocarbazol-4'-carboylamino)-4-methoxybenzene, containing 50 percent of dry substance, and 7.5 parts by weight of tetraethyleneglycol monomethyl ether of the formula $$CH_3O(CH_2CH_2O)_4H$$

were fed into a steam heated kneading device. Water was removed and the material was withdrawn by means of a cross-beater mill. The dust formation of the composition obtained was only one-fifteenth of that of an untreated material.

EXAMPLE 5

A mixture of 25 kg. of 1-(2',3'-hydroxy-naphthoylamino)-2,4-dimethoxy-5-chlorobenzene, 1.75 kg. of the sodium salt of oleyl-methyl-taurine, 1.75 kg. of gelatine and 0.5 kg. of the sodium salt of ethylene-diamine-tetraacetic acid was mixed, as indicated in Example 1, with 0.65 kg. of diethyleneglycol monobutyl ether of the formula $$CH_3CH_2CH_2CH_2O(CH_2CH_2O)_2H.$$

A composition was obtained, the dust formation of which was only one-fourth of that of the untreated compound.

EXAMPLE 6

A mixture of 370 parts by weight of 1-(2',3'-hydroxy-naphthoyl-amino)-naphthalene, 10 parts by weight of the sodium salt of ethylene-diamine-tetraacetic acid, 10 parts by weight of the sodium salt of dibutyl-naphthalene-sulfonic acid and 10 parts by weight of gelatine was mixed, as in Example 2, with 32 parts by weight of diethyleneglycol monobutyl ether of the formula $$(CH_3)_2CHCH_2O(CH_2CH_2O)_2H.$$

A composition was obtained, the dust formation of which was only one-sixth of that of the untreated compound.

EXAMPLE 7

When in Example 6 diethyleneglycol monobutyl ether was replaced by triethyleneglycol monopropyl ether of the formula $$(CH_3)_2CHO(CH_2CH_2O)_3H$$

a composition was obtained, the dust formation of which was only one-sixth of that of the untreated compound.

We claim:
1. Composition of matter consisting of 85 to 99.5 percent by weight of an ice-color coupling component selected from the group consisting of an arylamide of an aromatic or heterocyclic o-hydroxy-carboxylic acid or an acylacetic acid arylamide and
0.5 to 15 percent by weight of a compound of the formula

$$Alk-O-(CH_2CH_2O)_nH$$

in which Alk is alkyl of one to five carbon atoms and $n$ is a number of 2 to 5, with the proviso that the molecular weight is within the limits of about 150 to about 280.

2. The composition as claimed in claim 1, containing additionally an inorganic salt.

3. The composition as claimed in claim 1, containing additionally an alkali metal salt of a mineral acid or of carbonic acid.

* * * * *